United States Patent [19]

Valdespino

[11] 4,216,939

[45] Aug. 12, 1980

[54] RECREATIONAL VEHICLE LEVELING AND SUPPORT SYSTEM

[76] Inventor: Joseph M. Valdespino, 5023 Golf Club Pkwy., Orlando, Fla. 32808

[21] Appl. No.: 943,916

[22] Filed: Sep. 20, 1978

[51] Int. Cl.² .............................................. B66F 7/26
[52] U.S. Cl. .................................... 254/45; 254/86 H
[58] Field of Search .................... 254/45, 86 H, 86 R, 254/89 H, 89 R

[56] References Cited

U.S. PATENT DOCUMENTS

| | | | |
|---|---|---|---|
| 2,021,733 | 11/1935 | Luker | 154/86 H |
| 3,489,428 | 1/1970 | Hunter et al. | 254/86 R |
| 3,764,109 | 10/1973 | Hollis | 254/86 R |

*Primary Examiner*—Robert C. Watson
*Attorney, Agent, or Firm*—Duckworth, Hobby, Allen & Pettis

[57] ABSTRACT

A leveling and support system for recreational vehicles uses fluid cylinders located at predetermined positions on the recreational vehicle, driven by a master cylinder through a valving control system. The piston of the master cylinder is actuated by a motor driven or hand crank driven screw mechanism, so that a recreational vehicle can be supported or leveled by a single drive unit with controls operated from a single control position.

11 Claims, 7 Drawing Figures

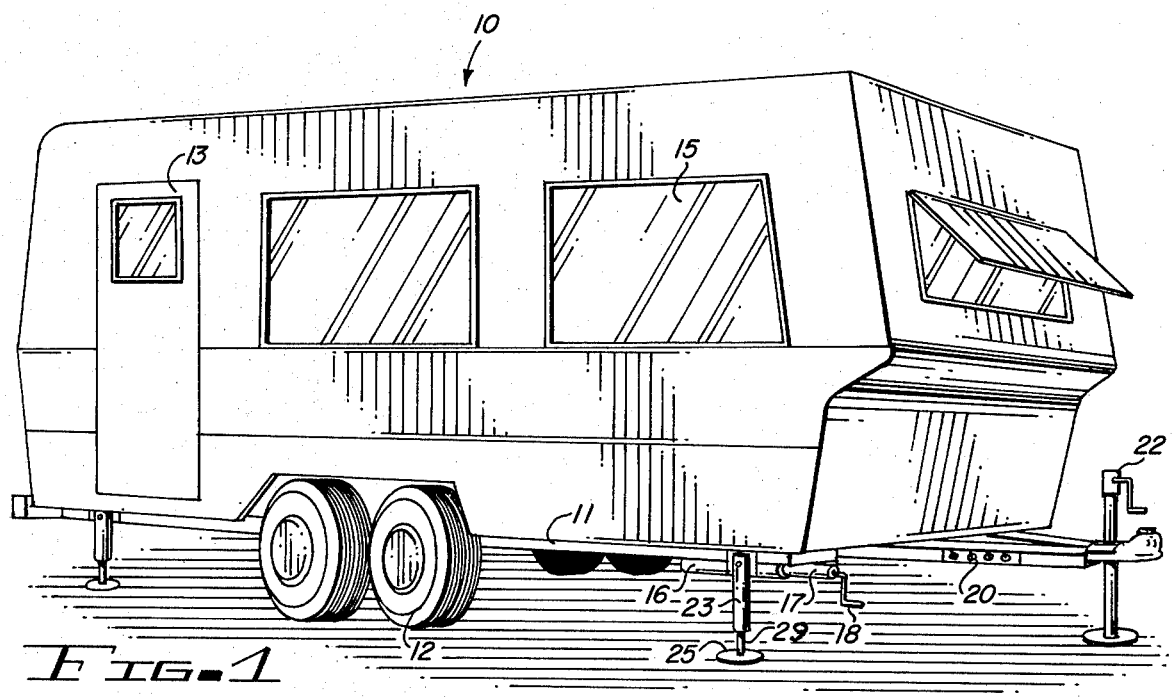
Fig. 1
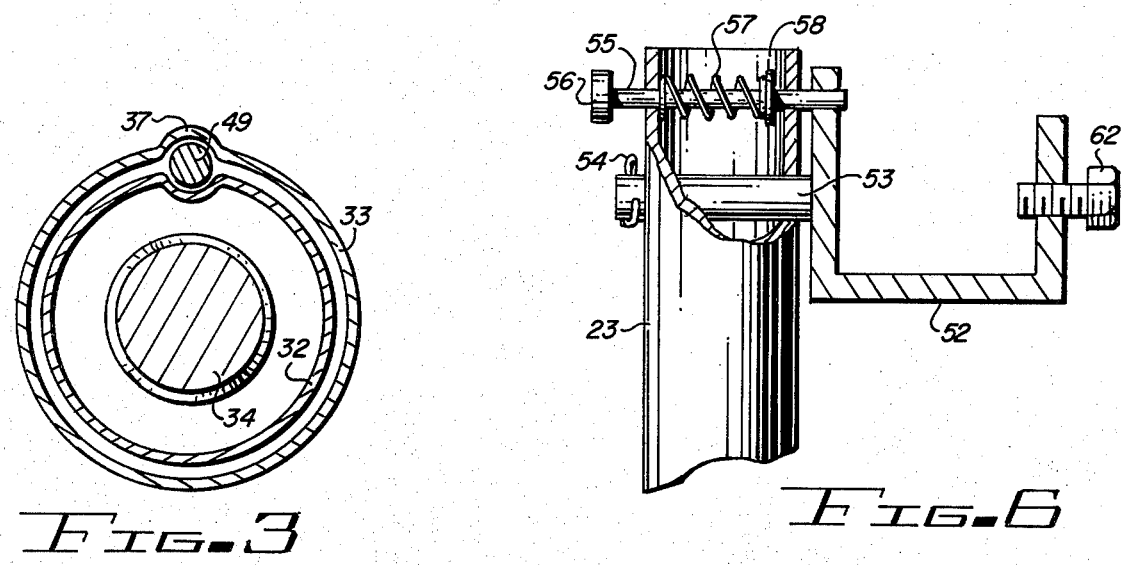
Fig. 3
Fig. 6
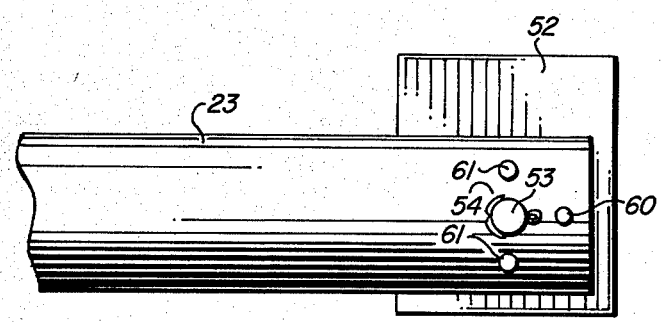
Fig. 7

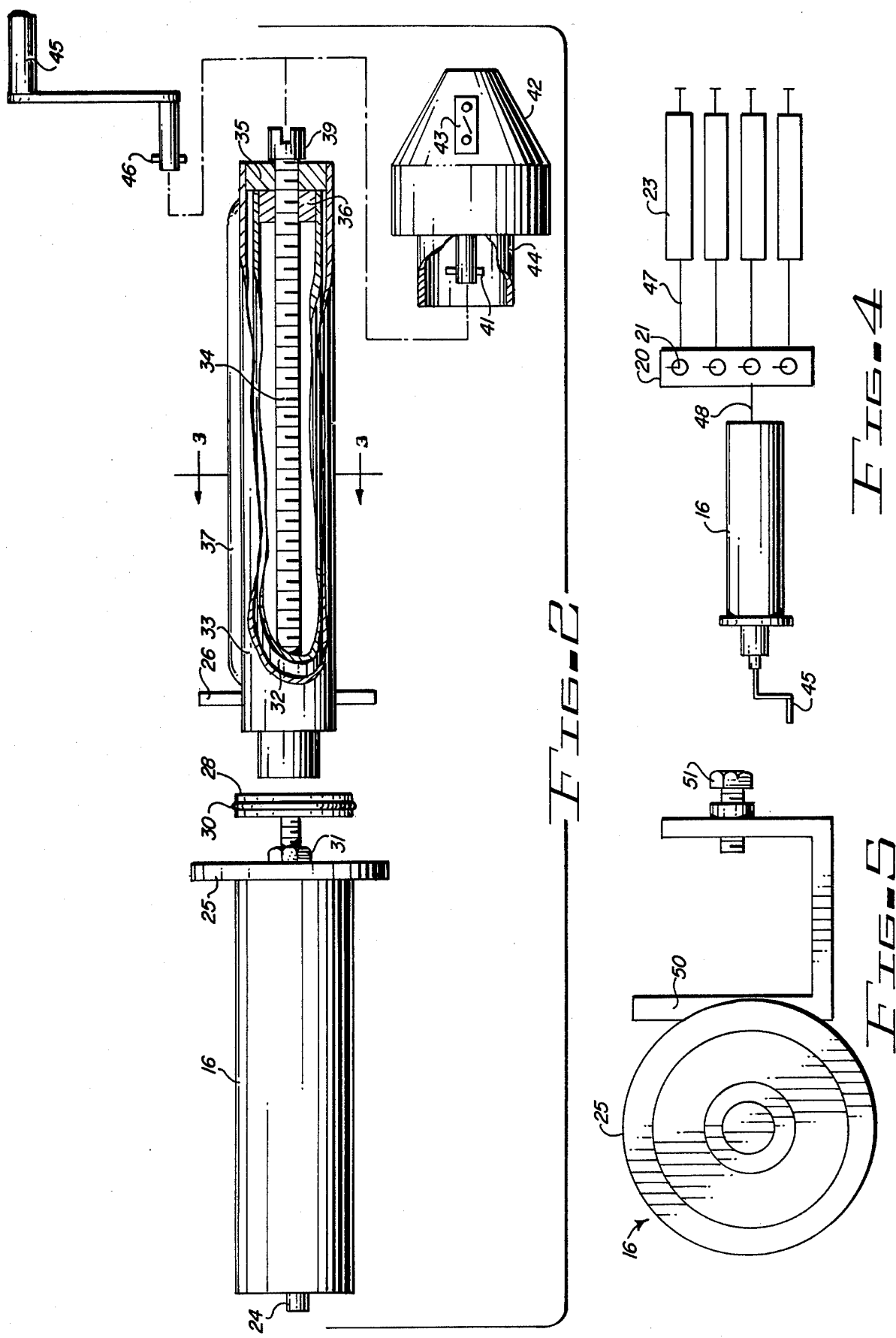

RECREATIONAL VEHICLE LEVELING AND SUPPORT SYSTEM

BACKGROUND OF THE INVENTION

1. Field of the Invention

The present invention relates to recreational vehicles and especially to a system for leveling and supporting a recreational vehicle utilizing fluid actuated cylinders driven from a master cylinder.

2. Description of the Prior Art

A variety of recreational vehicles is available on the market including small and large campers for attachment to the back of a family automobile for camping for short or extended periods of time; large motor homes and fifth wheel campers which do not have front wheels and are suspended by a "fifth wheel" to the back of a pick-up truck. This latter vehicle requires front end support when disconnected from the truck.

One of the problems encountered by most recreational vehicles is supporting the front end or tongue of the camper when the recreational vehicle is disconnected from the family car or other towing vehicles. The support must be adjustable to allow the vehicle to be adjusted for different heights to maintain the inside of the recreational vehicle level.

In addition, on the smaller campers, springs are such that the campers tend to be unstable and shake considerably when positioned in a campground. These problems are dealt with by hand actuated jacks which may be placed under the tongue of a camper, or mounted to the front portion of the fifth wheel camper, and which may be hand actuated to raise or lower the front portion of the vehicle. On smaller campers that tend to be unstable, a series of smaller hand operated jacks are sometimes positioned on the four corners and each jack operated to get the camper level and supported by the jacks so that the camper will not rock when walking from one side to the other of the camper.

In addition to the hand actuated jacks that are commonly used or supplied with recreational vehicles, auxiliary jacks have been available which are actuated by electric motors for raising and lowering a portion of the vehicle. These, however, require connection to electrical power and are expensive to purchase as an option to the recreational vehicles. Finally, large semi-trailers having fifth wheels have air over hydraulic jacks for supporting the trailers when disconnected from the cab portion and which are actuated by the truck's air system.

TYPICAL PRIOR ART

Inventions which use hydraulic jacks, or the like, may be seen in the following U.S. Pat. Nos.
3,350,063 —Thurlow,
4,052,073—Franchin,
3,697,044—Kowalski,
3,709,467—Mann,
3,758,074—Jeffries,
3,409,272—Rasmussen,
3,338,554—Gostomski,
3,567,271—Gostomski,
3,698,758—Dodgen,
3,640,502—Bargman,
3,360,141—Martin,
3,415,490—Steele,
3,955,797—Richards.

In addition, my prior U.S. Pat. No. 4,082,249, for a recreational vehicle leveling and support system, has a connection for a source of water under pressure which is connected to a plurality of water cylinders connected to the recreational vehicle and predetermined positions through a main valve and through one branch valve for each water cylinder. The main valve and the branch valves are used to raise and lower parts of the recreational vehicle from the pressure of a community water supply or a recreational vehicle water tank. This provides an inexpensive, reliable leveling and support system but is subject to the water freezing in very cold climates during mid-winter months. To overcome this, my prior patent provides means for draining the cylinders and locking the cylinder rods in place when the system is not in use. The use of a community water supply for lifting or squeezing derives from my prior U.S. patent application Ser. No. 805,895 for a Fluid System for Compacting and Squeezing, now U.S. Pat. No. 4,121,512. The present invention, on the other hand, provides an improved fluid level and support system, in which the individual cylinders are driven through control valves by a master fluid cylinder, which acts as a closed fluid system and therefore may have antifreeze in the fluid or otherwise be a fluid not subject to freezing except in very cold climates. The master cylinder piston is in turn driven by a screw push-/pull instrument so that a mechanical advantage is gained from both the screw pushing and pulling instrument and the hydraulic cylinder. Since a closed system is involved, pushing the piston and the master cylinder in one direction extends the individual hydraulic cylinders and retracts the individual cylinders when the piston is pulled in the other direction. Each individual cylinder can be locked in a predetermined position by closing its valve. Since the fluid is not generally compressible, it locks the cylinder in place until the valve is opened again.

SUMMARY OF THE INVENTION

A recreational vehicle leveling and support system has a master fluid cylinder having a piston located therein and a piston rod attached to the piston and extending therefrom. A plurality of fluid lifting cylinders is positioned in a spaced relationship to each other and mounted on a recreational vehicle in predetermined positions. The master cylinder is connected to each lifting cylinder through a control valve so that each valve can be operated individually. The control valves can be located at a predetermined control center for controlling different positions on the recreational vehicle from a single point. A rotable drive screw is coupled to the master cylinder piston rod for pushing and pulling the piston to actuate the master cylinder in each of the individual lifting cylinders, so that a recreational vehicle can be supported and leveled with the lifting cylinders from a single control point.

BRIEF DESCRIPTION OF THE DRAWINGS

Other objects, features and advantages of the present invention will be apparent from the written description and the drawings in which:

FIG. 1 is a perspective view of a recreational vehicle incorporating a preferred embodiment of the present invention;

FIG. 2 is a fragmentary exploded sectional view of the master cylinder and drive system;

FIG. 3 is a sectional view taken on the line 3—3 of FIG. 2;

FIG. 4 is a diagrammatic view of the control system of the present invention;

FIG. 5 is a sectional view of the master cylinder and its mounting bracket;

FIG. 6 is a fragmentary sectional view of the mounting bracket and cylinder locking system of the present invention; and FIG. 7 is a side sectional view of the cylinder locking system of FIG. 6.

DESCRIPTION OF THE PREFERRED EMBODIMENT

Referring to the drawings and especially to FIG. 1 a recreational vehicle 10 is seen having a frame 11 and wheels 12 mounted thereto and an entry doorway 13. Recreational vehicle 10 has a forward tongue 14 and a plurality of windows 15. The vehicle has mounted thereto a master fluid cylinder 16 which is mounted horizontal and parallel to the frame or chassis 11. The master cylinder 16 has a pushing or pulling drive system 17 which may be driven with a hand crank 18 in one embodiment of the present invention, but, typically would have an electric motor mounted thereto for driving the master cylinder 16 with the option to use a hand crank 18 in an emergency. The master cylinder 16 is connected through a master control or valving manifold 20 having a plurality of valves 21 mounted to the tongue 14. The tongue may also have a tongue jack 22 mounted thereto but does not form a part of the present invention. The control manifold 20 is in turn connected to a plurality of individual leveling and supporting cylinders 23 which may be placed on the front to support the front end of the recreational vehicle 10 or spaced at all four corners for supporting and leveling the camper at a campsite. Each lifting cylinder 23 has a cylinder rod 29 and may have a foot 25 on the bottom thereof. The operation may more clearly be understood in connection with FIGS. 2, 3 and 4 in which the hydraulic cylinder 16 has a fitting 24 at one end for hydraulic tubing, for connecting to the manifold 20 of FIG. 4. Cylinder 16 also has a flange 25 for bolting to a flange 26 of the push-pull drive mechanism 27. A piston 28 has a seal 30 and fits into the cylinder 16 but is bolted with a bolt 31 to an extendable and retractable inner casing or tube 32. Tube 32 extends inside an outer casing 33 of the push-pull drive mechanism 27. Inside the inner casing 32 is an elongated threaded shaft 34 which rides in bushings 35 at each end of the housing 33. The threaded shaft 34 has a screw shaft receiving an indexing head 39 at one end for rotating the threaded shaft 34 and the bushings 35. Rotation of the shaft 34 will drive the inner casing nut 36 which may have internal acme threads therethrough for engaging the teeth of the threaded shaft 34. The nut 36 is welded or fixedly attached to the inner casing 32 so that rotation of the shaft 34 will move the nut 36 and the inner casing 32 to drive it into or out of the outer casing 33.

Outer casing 33 has an elongated rib portion 37 protruding from one edge as shown in FIG. 3 adjacent an elongated groove 40 formed in the inner housing 32 so that a cylindrical or spherical key 49 can fit between the grooves formed in inner housing 32 and the outer casing 33 to prevent the rotation of inner housing 32 when the thread shaft is rotated, so that the nut 36 and housing 32 are driven linearly. This, in turn, drives the piston 28 to push or pull the piston depending upon the direction of rotation of the shaft 34. Shaft 34 is driven by the screw shaft receiving head 39 which may be engaged by a self indexing gear motor shaft 41 which is connected to a twelve volt D.C. motor 42, which can be actuated in the forward or reverse direction by switch 43. The motor 42 has a sleeve 44 which may extend over the outer casing 33 and may be slipped so that a hand crank 45 having a gear mating shaft 46 can engage the receiving indexing head 39 for hand cranking shaft 34 for driving the piston 28 in either direction depending upon the direction of rotation of the hand crank 45. This arrangement allows for the mechanical advantage of the threaded shaft 34 in combination with the mechanical advantage gained by the fluid or hydraulic cylinder 16 while at the same time allowing the control of all of the individual slave cylinders 23 through individual lines 47 to the control manifold 20 having valves 21 for controlling each line 47 and each lifting cylinder 23. A main fluid line 48 connects the manifold 20 to the master cylinder 16 which can be driven with the motor 42 and the hand crank 45. The electric motor 42 is actuated in either a forward or reverse direction by the switch 43, so that the individual valves 21 for each individual cylinder 23 can be controlled at a central location. Switch 43 and the manifold 20 with the valves 21 are located adjacent each other so that raising or lowering each of the cylinders 23 can be simultaneous or each can be controlled individually for leveling the camper on all four corners.

The master cylinder 16 and drive assembly can have a frame mounting bracket 50 attached to one side thereof, with a frame bracket bolt 51, so that the bracket can be attached to the chassis 11 of FIG. 1 without welding. Similarly, the individual slave cylinders can have a mounting bracket 52 as seen in FIGS. 6 and 7 attached thereto with a mounting bracket pin 53 which may be fixedly attached to the bracket 52 with a cylinder 23 riding thereon and held by cotter pin 54. A cylinder locking pin 55 can have a handle 56 at one end and might have a spring 57 mounted inside a hollow sleeve 58 at one end of the cylinder 23. The locking pin 55 can be slipped into an opening 60 in the bracket 52 for locking piston 28 in a vertical position or the cylinder 23 can be swung 90° for locking the pin 55 in either openings 61 for a horizontal storage position. The spring 57 holds the pin 55 in its locked position until the handle 56 is pulled, pulling the pin 55 against the spring 57 to unlock the piston 28 which can then rotate on the pin 53. Bracket 52 also has a frame locking bolt 62 for locking to frame 11 of the camper 10 in any position desired. It should, of course, be clear that the cylinders can be welded to the frame if desired, but in the after market, a detachable bracket is desirable.

It should be clear at this point that a recreational vehicle leveling and support system has been provided which is easily adapted to fit a wide variety of recreational vehicles. It will also be clear to those skilled in the art that the cylinders and components can be made of aluminum, steel or in the case of the individual lifting cylinders, a polymer material can be utilized without departing from the spirit and scope of the invention. Similarly, any fluid such as hydraulic fluid, can be utilized in the system, even though water with an antifreeze therein can be used without departing from the scope of the invention. Many of the parts are commercially available and reference may be had to my prior U.S. Pat. No. 4,082,249 for cylinder details. The present invention is accordingly not to be construed as limited to the particular forms shown which are to be considered illustrative rather than restrictive.

I claim:

1. A recreational vehicle leveling and support system comprising in combination:

a master fluid cylinder having a piston located therein and having a piston rod attached to said piston and being at least partially filled with a fluid, said master fluid cylinder having a chassis mounting bracket attached thereto for removably attaching said master fluid cylinder to the chassis of a recreational vehicle;

a plurality of fluid lifting cylinders attached to a recreational vehicle and positioned in spaced relationship to each other, each of said plurality of fluid lifting cylinders having a chassis mounting bracket attached thereto for removably attaching each said fluid cylinder to a recreational vehicle chassis;

drive means coupled to said master cylinder for pushing and pulling said master cylinder piston rod and piston when said drive means is actuated, said drive means having a threaded shaft rotatable for actuating said drive means for pushing or pulling said master cylinder piston and an electric motor connected to said threaded shaft for rotating said shaft for actuating said pushing and pulling of said master cylinder piston and also having a removable hand crank removably attachable to said threaded shaft for rotating said shaft for pushing and pulling said piston of said master fluid cylinder, and said drive means having a main casing having a flange fixedly attached thereto and said master fluid cylinder having a flange formed thereon for removably attaching to the flange on said drive means main casing; and fluid control means to control the flow of fluid between said master cylinder in each fluid lifting cylinder for controlling the flow of fluid between said master cylinder and each of said plurality of lifting cylinders to raise or lower a portion of said recreational vehicle responsive to the actuation of said master cylinder by said rotatable drive means, said fluid control means having a plurality of fluid valves mounted adjacent each other and adjacent one end of said drive means, whereby said fluid control means and drive means can be actuated from a single location, whereby a recreational vehicle can be supported or leveled with said lifting cylinders.

2. The leveling and support system of claim 1, in which said plurality of fluid lifting cylinders includes four cylinders.

3. The leveling and support system of claim 2, in which said drive means threaded shaft drives an internally threaded nut fixedly attached to a plunger casing for actuating said master fluid cylinder piston.

4. The leveling and support system of claim 3, in which said plunger casing has said master fluid cylinder piston fixedly attached thereto.

5. The leveling and support system in accordance with claim 1, in which said electric motor is removably attached to a self-indexing shaft connection mounted to said threaded shaft and is removably mounted to a drive means casing, whereby said electric motor can be removed and replaced with a hand crank.

6. The leveling and support system in accordance with claim 5, in which said master fluid cylinder and connected drive means are mounted horizontally to the chassis of a recreational vehicle.

7. The leveling and support system of claim 6, in which each said lifting cylinder mounting bracket has a plurality of openings therein, and each said fluid lifting cylinder has a spring loaded latching member for latching said cylinder in a vertical support position for supporting said recreational vehicle, or in a raised travelling position.

8. The leveling and support system in accordance with claim 7, in which each said fluid lifting cylinder is rotatably attached to said chassis mounting bracket with an elongated extended shaft fixedly attached to said bracket through a portion of each fluid lifting cylinder.

9. The leveling and support system in accordance with claim 4, in which said drive means has a threaded shaft and an inner plunger casing driven by an internally threaded nut fixedly attached thereto with said rotatable threaded shaft riding in said nut threads and having an outer casing with a key way located between said outer casing and said inner plunger casing to prevent rotation of said inner plunger casing during rotation of said threaded shaft to drive said plunger casing in and out for actuating the piston of said master fluid cylinder.

10. A recreational vehicle leveling and support system comprising in combination:

a master fluid cylinder having a piston located therein and being at least partially filled with a liquid;

a plurality of fluid lifting cylinders attached to a recreational vehicle at predetermined positions, and each operatively coupled to said master fluid cylinder;

pushing and pulling means fixedly attached to said master fluid cylinder for pushing or pulling said piston in said master fluid cylinder, said pushing and pulling means having an outer casing attached to said master fluid cylinder casing, an inner plunger casing slidably positioned inside said outer casing, a rotatable threaded shaft mounted inside said inner plunger casing, and coupled to said inner plunger casing with an internally threaded drive member fixedly attached to said inner housing and coupled to said rotating shaft, and a key way located between said plunger casing and said outer casing to prevent rotation of said inner casing relative to said outer casing, and connecting means coupled to said rotatable threaded shaft for removably coupling a drive member thereto;

a reversible DC electric motor with a coupling head removably coupled to said connecting means attached to said threaded shaft; and fluid control means connected between said master fluid cylinder and each of said fluid lifting cylinders for controlling fluid flow between said master cylinder and each fluid lifting cylinders.

11. A leveling and support system of claim 10, in which a hand crank has a coupling head attached thereto for coupling to said removable connecting means attached to said rotatable threaded shaft.

* * * * *